Patented Jan. 18, 1949

2,459,387

UNITED STATES PATENT OFFICE 2,459,387

METHOD OF CONDENSING ORGANOSILICOLS

Rob Roy McGregor, Verona, and Earl L. Warrick, Pittsburgh, Pa., assignors to Corning Glass Works, Corning, N. Y., a corporation of New York No Drawing. Application October 5, 1942, Serial No. 460,830

10 Claims. (Cl. 260—46.5)

This invention relates to organo-silicon compounds and methods of preparing them and, more particularly, to methods of condensing hydrolyzed organo-silicon compounds and to the resulting condensed products.

This application is a continuation in part of our co-pending application, Serial No. 432,530 filed February 26, 1942 now Patent No. 2,384,384.

Organo-silicon compounds having the general formula $R_nSiX_{4-n}$, where R is an organic radical, X is a hydrolyzable atom or group, and $n$ is an integer from 1 to 3 may be hydrolyzed to organo-silicols having the general formula $R_nSi(OH)_{4-n}$. The latter compounds, upon condensation by the splitting out of water between hydroxyl groups, form polymeric products in which each silicon atom is joined to another by an oxygen atom, thus, Si—O—Si. The resulting polymeric products are substances which vary from liquids of low viscosity to liquids of high viscosity and in some instances may be insoluble and infusible solids depending upon the particular compound in question. Because of certain properties which these condensed products possess, they are extremely useful for a variety of purposes as will be described below. The utility of the liquid condensed products is further enhanced by their amenability to further polymerization upon proper treatment so as to form other useful products.

It has been found that the condensation of the organo-silicols by the splitting off of water proceeds at different rates of speed depending on the particular compound being condensed and upon the conditions of condensation. In some instances, the condensation takes place concurrently with the hydrolysis of the hydrolyzable organo-silicon compound so that a partially, if not a completely dehydrated product, is obtained immediately at the termination of hydrolysis. In other instances, it is necessary to heat the hydrolyzed compound or silicol to an elevated temperature before any substantial condensation takes place. The mono-substituted silicols (i. e. having the formula $RSi(OH)_3$), in particular, require heating to a high temperature in order to produce a highly condensed product. Heating to a high temperature causes the more volatile polymers of the condensed product to volatilize before they have a chance to be condensed to less volatile polymers. Accordingly, such extreme heating is objectionable.

One of the objects of our invention is to provide a new method of condensing organo-silicols.

Another object of our invention is to condense organo-silicols by treating them with a dehydrating agent.

Still another object of the present invention is to prepare new compositions of matter by condensing organo-silicols in the presence of a dehydrating agent.

In accordance with our invention, the condensation of the organo-silicol is carried out in the presence of a dehydrating agent. We have found that by so doing the loss of volatile polymers is considerably reduced since the condensation can take place at a lower temperature and also because the condensation proceeds to completion more rapidly than heretofore. In some instances, the condensation was found to proceed without the application of any heat when a dehydrating agent was present. Among the dehydrating agents actually used were the following: phosphorus pentoxide, boron trifluoride, sulphuric acid, activated alumina, boric oxide, activated magnesia, glacial acetic acid, acetic anhydride, and phthalic anhydride. It is believed that any dehydrating agent will accelerate the rate of condensation.

For a better understanding of the present invention, reference should be had to the following illustrative examples.

Example 1

A sample of mono-butyltriethoxy silicon was first hydrolyzed in the presence of nitric acid. One portion of the hydrolyzed product was heated under a slight vacuum with a stream of dry air passing over it for a total of 45 hours, at approximately 160° C. Its molecular weight was determined as 1205. To another portion of the hydrolyzed product was added phosphoric anhydride. The mixture was then heated for 24 hours at about 160° C. Its molecular weight was found to be 1650 as against the 1205 found for the $P_2O_5$ untreated portion. It was therefore apparent that the addition of phosphoric anyhdride produces higher molecular weight polymers.

Example 2

Mono-methyltriethoxy silicon was hydrolyzed in an alcohol solution containing three mols of water per mol of silicon ester and approximately one per cent of oxalic acid. The solution was kept at 30° C. for 24 hours. It was then mixed with an equal volume of carbon tetrachloride and washed with five times its volume of water. Two layers appeared which were separated. An aliquot portion of the carbon tetrachloride layer, by which the hydrolyzed product was preferentially dissolved, was added to a 50% ether solution of boron trifluoride, the BF₃ in the final solution being less than 1% by weight of the hydrolyzed product. This portion containing boron trifluoride and another aliquot portion containing only the hydrolyzed product dissolved in carbon tetrachloride were then heated at 80° C. for 24 hours and then at 100° C. for 20 hours. During this heating the solvent was evaporated and the hydrolyzed product in both portions converted to a resin. Both portions were weighed. It was found that the portion containing boron trifluoride had lost less than half the weight lost by the untreated portion, demonstrating that in the presence of a dehydration agent higher molecular weight materials are formed which are not readily volatilized.

*Example 3*

A sample of mono-butyltriethoxy silicon was subjected to the procedure given in Example 2 except that toluene was used instead of carbon tetrachloride as a solvent and also additional heating of the two portions of the hydrolyzed produce was maintained for 20 hours at 125° C. and for 12 hours at 175° C. Again the boron trifluoride treated portion lost less than one-half the weight lost by the untreated sample.

*Example 4*

A sample of mono-amyltriethoxy silicon was hydrolyzed and condensed by the procedure given in Example 2 except that toluene was used instead of carbon tetrachloride as a solvent for the hydrolyzed product. It was found that the untreated hydrolyzed product lost nearly twice as much weight as the portion containing boron trifluoride.

*Example 5*

A sample of dimethyldiethoxy silicon was refluxed for 30 minutes with hydrochloric acid and water. The resulting alcohol and water were washed out leaving an oily liquid which had a viscosity of 13.4 Saybolt seconds. It was then held overnight at 100 mm. pressure and at 120° C. Its viscosity was then 19.2 seconds. Heating under vacuum was continued for a total of 46 hours. The liquid at that point had a viscosity of 23.1 seconds. Phosphoric pentoxide was then added. After two and one-half hours with heat and under vacuum, the viscosity of the fluid was 67.3 seconds. Further heating under vacuum for another 24 hours produced a material having only slight flow at room temperature.

*Example 6*

A sample of dibutyldiethoxy silicon was treated in the same manner as the dimethyldiethoxy silicon in Example 5. Before the addition of phosphorus pentoxide the hydrolyzed product had a viscosity of 46.8 seconds. At the end of the two and one-half hours of heating in presence of phosphorus pentoxide its viscosity was 422 Saybolt seconds which increased to 1120 Saybolt seconds after further heating for 24 hours. Another sample of dibutyldiethoxy silicon was hydrolyzed with alcohol and hydrochloric acid to an oil. This oil was held at 100° C. for 13 hours with air blowing through it to hasten its polymerization. Its viscosity was then determined as 276 Saybolt seconds as compared to the 1120 Saybolt seconds of the oil treated with phosphorus pentoxide.

*Example 7*

A low viscosity dimethyl silicone was prepared by hydrolyzing dimethyldiethoxy silicon in the following manner. Fifty per cent by volume of dimethyldiethoxy silicon was refluxed with twenty-five per cent by volume of concentrated hydrochloric acid and twenty-five per cent by volume of 95% alcohol. The reflux was stopped after one hour and the product was washed with water. Heating and stirring in a low pressure air stream served to dry and at the same time to remove some low polymers from the liquid. After drying the liquid product had a viscosity of 212 Saybolt seconds at 30° C. It was then found that viscosities of the order of 300,000 or more Saybolt seconds at 30° C. were obtained by treating the liquid with a small amount of anhydrous boric oxide (about 1%–2%) and agitating the liquid while heating it at about 250° C. in an atmosphere of $CO_2$. By this means the rise in viscosity is quite rapid and high values are attained in a relatively short time. Apparently, the boric oxide does not combine to any appreciable extent with the liquid because it subsequently settles to the bottom of the container.

The above examples demonstrate that we have provided a method of increasing the rate of condensation of organo-silicols. We have found that the method is applicable to organo-silicols in which the organic substituents are alkyl, aryl, or mixed alkyl and aryl. It is believed apparent that the method is applicable to any organic-silicol since it is the hydroxyl to silicon bond which is primarily involved. The quantity of dehydrating agent used and the amount of heating required will of course vary from compound to compound but may be readily determined by preliminary tests. Furthermore, it is believed that any dehydrating agent may be employed as is well indicated by the variety of those named above which we have found to be effective. Not only may these dehydrating agents be used to speed up the condensation of single organo-silicols but they may also be utilized in the co-condensation of mixtures of different organo-silicols to form co-polymers.

As already pointed out, the liquid products of condensation may be further polymerized by other methods of treatment after substantially all of the hydroxyl groups have been removed. These other methods appear to involve the rearrangement of the Si-O-Si bonds already present or the formation of additional Si-O-Si bonds by the elimination of organic groups to form larger molecules. It has been found that some of the dehydrating agents named above also possess the property of effecting this further polymerization so that the same agent may be employed for carrying the polymerization of the liquid condensed products beyond the dehydrated stage to yield other products of great utility.

It has been found desirable in certain instances to leave the dehydrating agent in the final condensed product rather than attempt to remove it by solvent extraction or the like. The presence of the agent appears to give the product properties which enhance its utility for certain purposes. In other instances it was found advisable to remove the agent. Certain of the dehydrating agents employed were extremely difficult to separate from the condensed products indicating possibly that they formed co-polymers with the condensed products.

The condensation products are extremely useful in a wide variety of commercial applications. They may be used as lubricants, hydraulic fluids, impregnants for electrical insulating materials, dielectrics, in coating compositions, and so on.

We claim:

1. The method of condensing an organo-silicol whose organic substituents consist essentially of hydrocarbon radicals attached to silicon through carbon-silicon linkages, there being less than three hydrocarbon radicals per silicon atom which comprises dehydrating said silicol in the presence of boron trifluoride.

2. In the process of increasing the average molecular weight of a liquid alkyl silicol having less than three alkyl radicals per silicon atom, the step comprising treating said silicol with boron trifluoride at a temperature and for a time sufficient to produce an increase in viscosity.

3. In the process of preparing high molecular weight polymers from a composition comprising a hydrolyzable silicane having one alkyl radical attached to each silicon atom, the remaining valences of the silicon atoms being satisfied by ethoxy radicals, the steps comprising hydrolyzing said silicane, partially condensing the hydrolysis product and then treating the partially condensed product with boron trifluoride at a temperature and for a time sufficient to produce an increase in viscosity.

4. In the process of preparing high molecular weight polymers from a composition comprising a hydrolyzable silicane having one alkyl radical attached to each silicon atom, the remaining valences of the silicon atoms being satisfied by ethoxy radicals, the steps comprising hydrolyzing said silicane in the presence of an acid, washing out the acid, and then treating the product with boron trifluoride at a temperature and for a time sufficient to produce an increase in viscosity.

5. The method which comprises hydrolyzing mono-methyl triethoxy silicane in the presence of an acid, washing out the acid and then treating the product with boron fluoride at a temperature and for a time sufficient to produce an increase in viscosity.

6. The method of condensing an organo silicol having less than three organic radicals per silicon atom, said organic radicals being alkyl radicals, which comprises dehydrating said silicol in the presence of boron trifluoride.

7. The method of condensing an organo silicol having a single organic radical attached to each silicon atom through carbon-silicon linkage, said organic radical being an alkyl radical, which comprises dehydrating said silicol in the presence of boron trifluoride.

8. The method which comprises hydrolyzing a mono-alkyl triethoxysilicane in the presence of oxalic acid, washing out the acid and then dehydrating the alkylsilicon hydrolysis product in the presence of boron trifluoride.

9. The method which comprises hydrolyzing methyltriethoxysilicane in the presence of oxalic acid, washing out the acid and then dehydrating the methylsilicon hydrolysis product in the presence of boron trifluoride.

10. The method of condensing an organo silicol having a single organic radical attached to each silicon atom through carbon-silicon linkage, said organic radical being a monovalent hydrocarbon radical, which comprises dehydrating said silicol in the presence of boron trifluoride.

ROB ROY McGREGOR.
EARL L. WARRICK.

REFERENCES CITED

The following references are of record in the file of this patent:

UNITED STATES PATENTS

| Number | Name | Date |
|---|---|---|
| 2,258,220 | Rochow | Oct. 7, 1941 |
| 2,371,068 | Rochow | Mar. 6, 1945 |

FOREIGN PATENTS

| Number | Country | Date |
|---|---|---|
| 113,708 | Australia | Sept. 4, 1941 |

OTHER REFERENCES

Rochow, Chemistry of the Silicones, published by Wiley 1946, pages 51, 52, 53, and 70.

Rochow et al., Journ. Amer. Chem. Soc., vol. 63, March 1941, pages 798–800.

Andrianov, Org. Chem. Ind. U. S. S. R., vol. 6, pages 203–207 (1939).

Robison et al., Journ. Chem. Soc. (London), vol. 93–94, pages 439–73. Chem. Abstr. vol. 2, page 1457 (1908).

Beilstein, Handbuch der Organ. Chem. vol. 4, page 627, 4th ed. (1922).

Kipping, J. Chem. Soc., London, 1928, pages 1429 to 1431.

Kipping, Proceeding Royal Soc., London, vol. A 159, 1937, pages 139 to 148.

Koton, J. Applied Chem. U. S. S. R., vol. 12, pages 1435–9 (1934).